Patented June 26, 1945

2,379,065

UNITED STATES PATENT OFFICE 2,379,065

GELATINOUS MATERIAL

Edward F. Christopher, Chicago, Ill., assignor to Industrial Patents Corporation, Chicago, Ill., a corporation of Delaware No Drawing. Application July 16, 1942, Serial No. 451,228

10 Claims. (Cl. 106—125)

This invention relates to a method of improving or increasing the viscosity of gelatinous material.

The term "gelatinous material" is employed herein and in the claims to designate all grades of glue and gelatin, including edible and inedible glue and gelatin products and those products generally termed "low grade gelatin" and "high grade glue."

One of the important characteristics of gelatin, for example, gelatin used in marshmallow formulas and various formulas for producing edible foams, is the viscosity of the gelatinous material.

One of the objects of the present invention is to provide a gelatinous material having a high viscosity.

Another object of this invention is to provide an edible gelatinous material which is particularly suited for the preparation of ice cream and marshmallow mixes.

Two types or two classes of substances have been proposed for increasing the viscosity of gelatinous material, namely, reagents which react chemically with the protein molecule to increase the viscosity of the gelatinous material and reagents which do not react chemically with the protein molecule, but because of their extremely high viscosity impart a higher viscosity when mixed with or dissolved in solutions of glue and gelatin. In the first class, the reagents generally exhibit a definite tanning action upon the protein molecule. Examples of these substances are formaldehyde, aldose sugars, furfuraldehyde, soluble salts of aluminum, iron, chromium, and the like. In the second class of substances, there is no chemical reaction or no appreciable chemical reaction between the individual reagent and the protein molecule. These substances include, starches, water soluble cellulose esters and ethers, gums, such as locust, karaya gum and tragacanth, sodium alginate, and the like.

The first class of substances has been employed, but the use of such chemicals in industry is accompanied by definite disadvantages. The most serious disadvantage of these reagents is that they tend and do promote insolubility of the protein material. A further disadvantage is that these substances tend to and do promote a denaturing effect upon the protein material which prevents a reconstitution of the dried material to form desired solutions or suspensions. These so-called tanning agents impart what might be termed an unnatural viscosity and frequently are responsible for the ropiness and stringiness in such protein solutions or suspensions.

Various reagents of the second class possess a high viscosity and impart an increased viscosity to gelatinous material because of their high viscosity. Such reagents impart to the gelatinous material a smooth and natural body, except for certain of them which are incompatible with gelatin and glue and tend to separate or stratify. Various starches, methyl cellulose, tragacanth and sodium alignate, are examples of such substances and they appear to possess a peculiar property of holding water so that although a satisfactory homogeneous solution or suspension in water is formed with the glue or gelatin, a stratification takes place within a relatively short period of time. The stratification may be due to the kind of charge which is borne by the various colloidal materials in suspension. Another disadvantage of these substances is that the increase in viscosity imparted by them is not permanent in nature. For example, starches, mucin, gum tragacanth, and the like, impart an increased viscosity to gelatin solutions. Upon evaporation and drying of such solutions, these substances do not again affect the viscosity to any appreciable degree. Gelatin solutions prepared from such dried products possess a viscosity which is about the same as the viscosity of the same gelatin containing no such modifying agents.

I have discovered that the addition of small proportions of deacetylated chitin to aqueous solutions or suspensions of gelatinous material increases materially the viscosity of the gelatinous material without an appreciable effect upon the jelly strength, as measured by the Bloom gelometer. The use of deacetylated chitin does not parallel the use of the usual reagents having high viscosities. The important distinguishing feature between the deacetylated chitin and other reagents employed because of their extremely high viscosity is that the effect upon the viscosity of this substance is more or less permanent. Solutions or suspensions containing gelatinous material and deacetylated chitin may be dried, ground and redissolved to form a solution or suspension which will possess about the same viscosity as the original solution or suspension.

Chitin is a colloidal material not unlike cellulose and starch and has a nucleus of chitoseamine, while cellulose and starch has a nucleus of glucose. Chitoseamine is a hexose amine and when polymerized and acetylated, forms the main constituent of chitin. Chitin is an organoplastic nitrogeneous material which is the principal constituent of dermatic envelope and tendon like parts of articulate animals. Chitin is the animal analogue of the cellulose of plants. A particular source of chitin is crustacea shells and it is conveniently prepared in accordance with the methods described in United States Patents No. 2,040,879, No. 2,047,225, and No. 2,047,226.

The effect of the addition of deacetylated chitin in various proportions upon the properties of a sample of gelatin is set forth in the following tables:

*Table I*

|  | Dried gelatin samples tested on 11% moisture basis | | | |
| --- | --- | --- | --- | --- |
|  | H₂O | Jelly | Viscosity | pH |
| Gelatin control "A" | 9.30 | 259 | 59 | 4.9 |
| Gelatin containing .9% deacetylated chitin | 9.50 | 269 | 66 | 4.9 |
| Gelatin containing 1.3% deacetylated chitin | 8.70 | 270 | 73 | 5.1 |
| Gelatin containing 1.8% deacetylated chitin | 9.70 | 284 | 117 | 5.1 |
| Gelatin containing 3.6% deacetylated chitin | 9.20 | 281 | 115 | 5.1 |
| Gelatin containing 4.5% deacetylated chitin | 9.30 | 279 | 103 | 5.08 |

*Table II*

|  | Dry gelatin tested on 11% moisture basis | | | |
| --- | --- | --- | --- | --- |
|  | H₂O | Jelly | Viscosity | pH |
| Gelatin control "B" | 9.50 | 267 | 61 | 4.3 |
| Gelatin containing 1% deacetylated chitin | 8.60 | 256 | 63 | 4.6 |
| Gelatin containing 2% deacetylated chitin | 9.60 | 259 | 70 | 4.5 |
| Gelatin containing 3% deacetylated chitin | 9.10 | 257 | 80 | 4.6 |
| Gelatin containing 4% deacetylated chitin | 8.90 | 258 | 92 | 4.7 |
| Gelatin containing 6% deacetylated chitin | 9.10 | 263 | 132 | 4.8 |
| Gelatin containing 8% deacetylated chitin | 9.30 | 276 | 190 | 4.8 |

The effect of various proportions of deacetylated chitin upon various properties of a sample of glue is set forth in the following table:

*Table III*

|  | Dry glue tests on 11% solids basis | | |
| --- | --- | --- | --- |
|  | H₂O | Jelly | Viscosity |
| Hide glue control | 10.70 | 626 | 102 |
| Hide glue containing 1.54% deacetylated chitin | 9.65 | 611 | 143 |
| Hide glue containing 3.08% deacetylated chitin | 9.60 | 618 | 207 |
| Hide glue containing 3.85% deacetylated chitin | 9.80 | 614 | 248 |
| Hide glue containing 4.62% deacetylated chitin | 9.70 | 625 | 311 |

The glue and gelatin samples referred to in the above tables were tested according to the standard methods for determining viscosity and jelly strength adopted by the National Association of Gelatin and Glue Manufacturers. The viscosities are in millipoises and the gelatin strength are in grams.

Since the increase in viscosity is permanent the chitin may be incorporated conveniently in the liquors before preparing the dried glue and gelatin products.

The proportion of chitin which is added to the glue or gelatin may be varied over a wide range dependent upon the properties of the particular gelatinous material and upon the particular sample of chitin which is employed. Various grades of chitin are obtainable and the properties such as the viscosity of their solutions are dependent upon the degree of treatment during the course of preparation. In order to obtain the desired increase in the viscosity of a particular sample of glue or gelatin it may be that much greater quantities or proportions of one sample of deacetylated chitin are required to effect the same increase in viscosity as is obtainable by the use of much smaller proportions or quantities of a different sample of the deacetylated chitin. The amount or quantity is also dependent upon the desired increase in viscosity. In general, I have found that up to about 20 per cent to 25 per cent deacetylated chitin is sufficient to impart reasonable increases in viscosity which may be desired.

I have found that dried glue and gelatin products containing up to 50 per cent to 60 per cent or more deacetylated chitin may be conveniently prepared. Such products may be blended with glues and gelatins to provide mixtures containing amounts of deacetylated chitin necessary to impart to the solutions or suspensions of such mixtures the desired properties.

It is to be understood that the foregoing specific examples are not intended as limitations, but have been set forth as being merely illustrative of my invention. Various modifications will suggest themselves to those skilled in the art and may be made without departing from the spirit and scope of this invention.

I claim:

1. The method of producing glue of increased viscosity which comprises adding to and incorporating in glue in aqueous solution an amount of deacetylated chitin sufficient to cause a substantial increase in said viscosity.

2. The method of producing gelatin of increased viscosity which comprises adding to and incorporating in gelatin in aqueous solution an amount of deacetylated chitin sufficient to cause a substantial increase in said viscosity.

3. As an article of manufacture, a glue product comprising a major proportion of glue and a minor proportion of deacetylated chitin, said deacetylated chitin being present in sufficient amount to cause a substantial increase in the viscosity of the glue.

4. As an article of manufacture, a gelatin product comprising a major proportion of gelatin and a minor proportion of deacetylated chitin, said deacetylated chitin being present in sufficient amount to cause a substantial increase in the viscosity of the gelatin.

5. As an article of manufacture, a gelatinous material product comprising gelatinous material of the class consisting of glue and gelatin and an amount of deacetylated chitin, the amount of deacetylated chitin being sufficient to substantially increase the viscosity of the gelatinous material.

6. The method of increasing the viscosity of glue and gelatin which comprises adding thereto deacetylated chitin in sufficient amount to cause a substantial increase in said viscosity.

7. The method of producing glue and gelatin materials of increased viscosity which comprises adding to said materials in aqueous solutions deacetylated chitin in sufficient amount to cause a substantial increase in the viscosity of said materials.

8. The method of producing glue and gelatin materials of increased viscosity which comprises adding to and incorporating in said materials in aqueous solution up to about 25 per cent by weight of deacetylated chitin and in sufficient amount to cause a substantial increase in viscosity and thereafter drying the liquor.

9. A gelatinous product comprising mainly a material of the class consisting of glue and gelatin and a minor proportion of deacetylated chitin, said deacetylated chitin being present in sufficient amount to substantially increase the viscosity of said gelatinous material.

10. A gelatinous product comprising mainly a material of the class consisting of glue and gelatin and up to 25 per cent by weight of deacetylated chitin, said deacetylated chitin being present in sufficient amount to cause a substantial increase in viscosity of said product.

EDWARD F. CHRISTOPHER.